No. 693,078. Patented Feb. 11, 1902.
M. T. STEVENS.
ACETYLENE GAS GENERATOR.
(Application filed Apr. 13, 1901.)
(No Model.) 3 Sheets—Sheet 1.
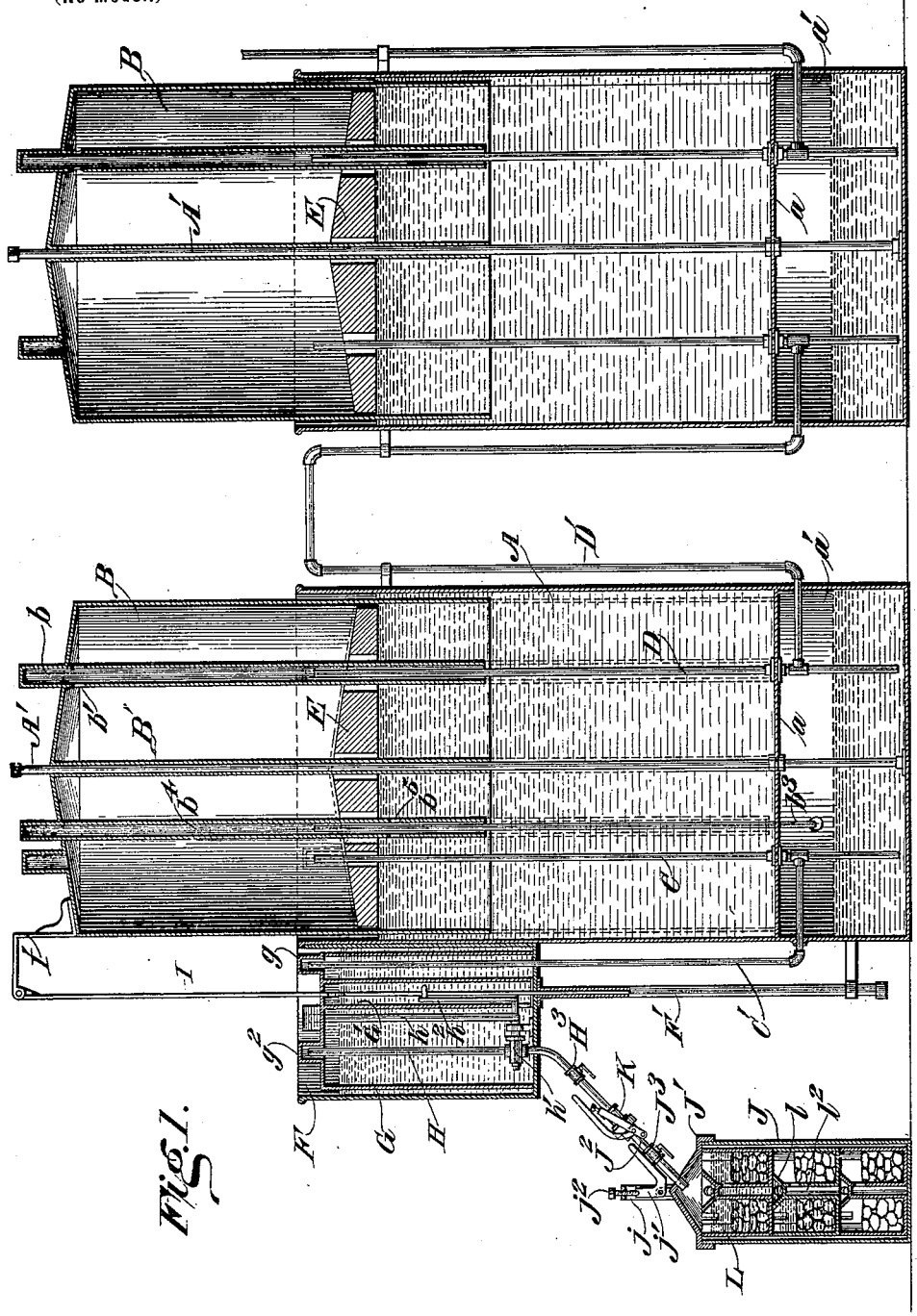
WITNESSES
M. C. Fowler
James R. Mansfield
INVENTOR:
Mott T. Stevens
By Alexander & Dowell
Attorneys No. 693,078. Patented Feb. 11, 1902.
M. T. STEVENS.
ACETYLENE GAS GENERATOR.
(Application filed Apr. 13, 1901.)
(No Model.) 3 Sheets—Sheet 2.
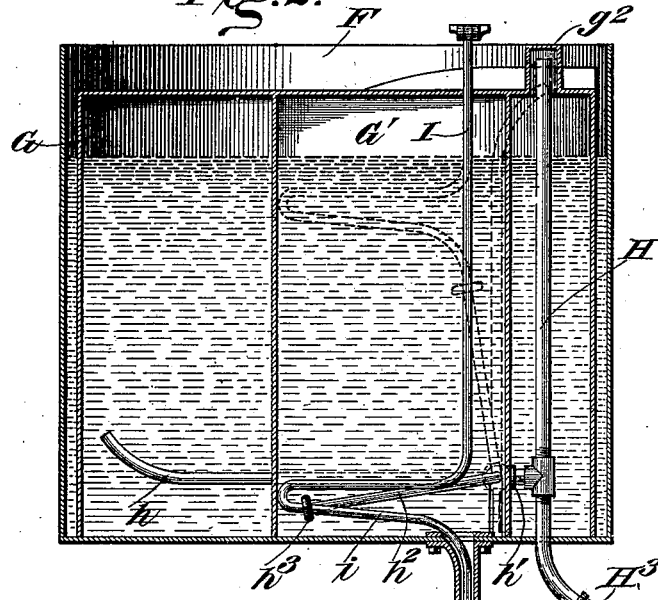
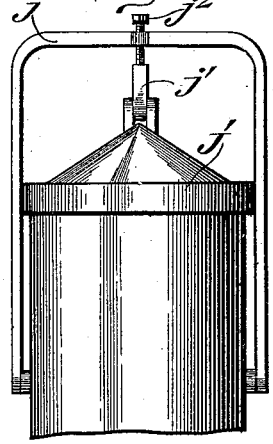
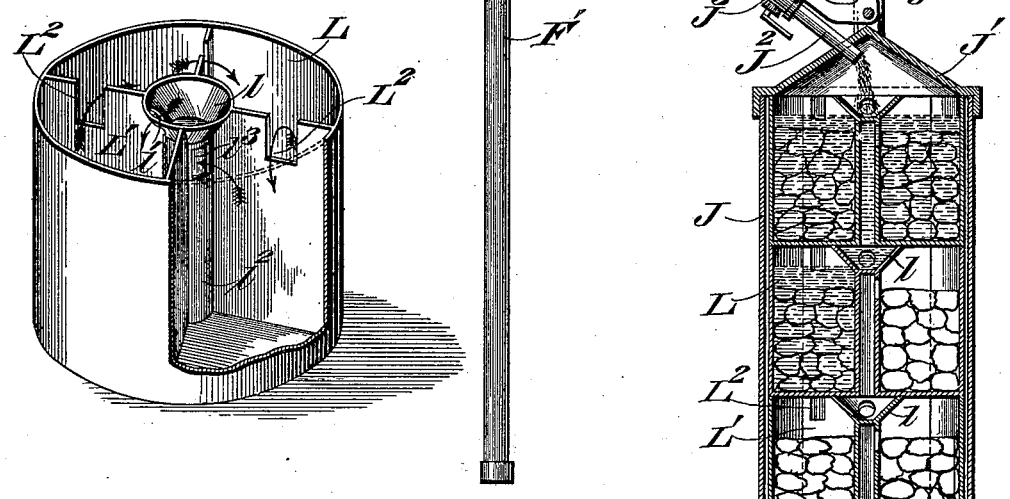
WITNESSES
M. C. Fowler
James R. Mansfield
INVENTOR:
Mott T. Stevens
By Alexander & Dowell
Attorneys No. 693,078. Patented Feb. 11, 1902.
M. T. STEVENS.
ACETYLENE GAS GENERATOR.
(Application filed Apr. 13, 1901.)
(No Model.) 3 Sheets—Sheet 3.
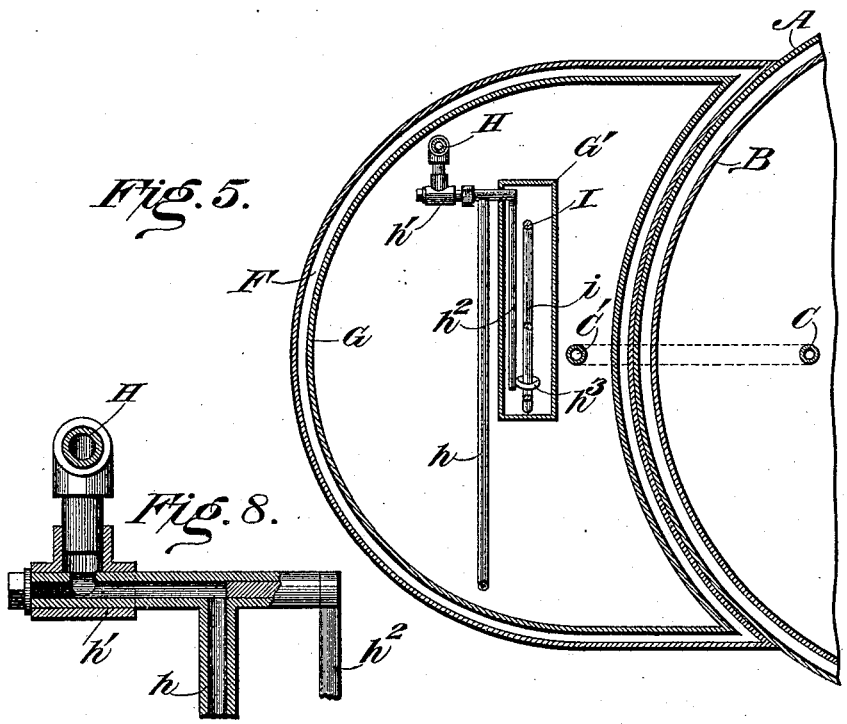
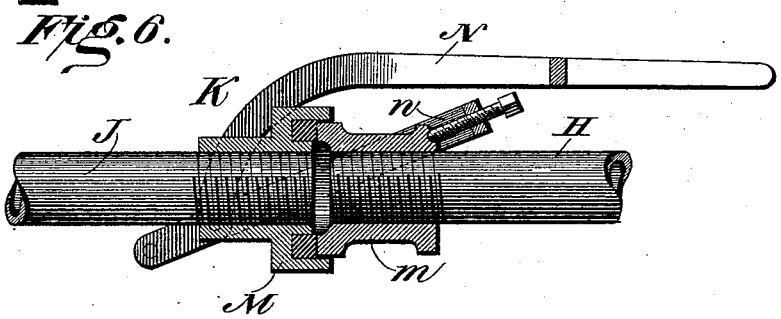
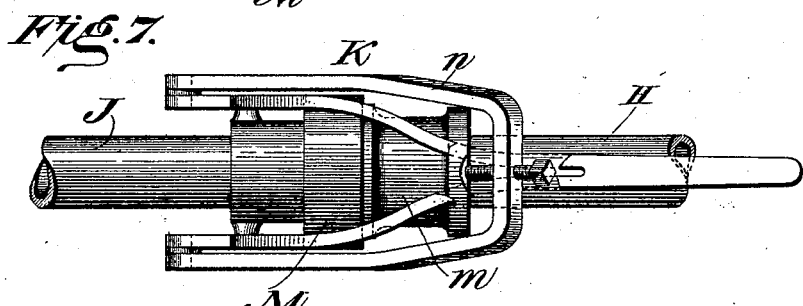
WITNESSES
M. E. Fowler
James R. Mansfield
INVENTOR
Mott T. Stevens
By Alexander & Dowell
Attorneys
THE NORRIS PETERS CO., PHOTO-LITHO., WASHINGTON, D. C.

UNITED STATES PATENT OFFICE.

MOTT T. STEVENS, OF WAHPETON, NORTH DAKOTA.

ACETYLENE-GAS GENERATOR.

SPECIFICATION forming part of Letters Patent No. 693,078, dated February 11, 1902.

Application filed April 13, 1901. Serial No. 55,735. (No model.)

*To all whom it may concern:*

Be it known that I, MOTT T. STEVENS, of Wahpeton, in the county of Richland and State of North Dakota, have invented certain new and useful Improvements in Gas-Generators; and I hereby declare that the following is a full, clear, and exact description thereof, reference being had to the accompanying drawings, which form part of this specification.

This invention is an improvement in gas-generating apparatus wherein gases, preferably illuminating-gas, are produced by chemical action, as by admitting water onto calcium carbid, for instance; and the object of the invention is to provide a self-controlling apparatus of a simple, reliable, and efficient construction.

Briefly stated, the apparatus embodies a gas cooler and drier, a storing-tank or gasometer connected therewith, a water-supply and cooling chamber attached to the gasometer and connected to the generating-chamber, means whereby the flow of water is automatically controlled by the rise and fall of the gasometer, and a generating-chamber detachably connected to the water-supply chamber, the generating-chamber being detachable from the apparatus for cleansing or for replenishing the carbid, &c. Within said generating-chamber is a series of carbid-holders, each having a series of compartments and so constructed as to be successively filled with water, so that the generation of gas will be regular and uniform.

The invention therefore consists in the novel constructions and combinations of parts of the apparatus, as hereinafter claimed, and the accompanying drawings illustrate a preferred form of apparatus embodying my invention, which I will now describe in detail.

In said drawings, Figure 1 is a sectional elevation of the complete apparatus, showing the parts in the position assumed when supply of water to generator is cut off. Fig. 2 is an enlarged section through water-supply and cooler and generator, showing parts in position to admit water to generating-chamber. Fig. 3 is a detail view of one of the carbid-holders. Fig. 4 is a detail view of the generator-cover fastening. Fig. 5 is a detail horizontal section through the water-supply chamber. Figs. 6 and 7 are detail sectional and plan views of the coupling between the water-supply chamber and generator. Fig. 8 is a detail section through the water-supply-regulating pipe.

A designates a cylinder forming the lower portion or tank of the gasometer, within which is an inverted gas-holder B. This tank has a false bottom $a$, below which is a chamber $a'$, forming a drip-chamber and water seal for the gas-inlet pipe C and outlet-pipe D, hereinafter referred to.

The holder B is limited in its upward movement by a rod A', fastened to the bottom of the tank A and extending up through the center of the holder, the latter being provided with a central tube B' to surround rod A' and prevent escape of gas. The holder is also provided with a tube $b$, which extends from the bottom to a point slightly above the top of the holder and surrounds the outlet-pipe D. The holder may be provided with a relief or vent pipe $b^3$ to prevent undue pressure of gas. This pipe telescopes into a tube $b^4$, depending from the cover and closed at its upper end, but provided near its lower end with openings $b^5$, which if the holder rises beyond the safe point will emerge from the water and permit gas to escape into the tube $b^4$ and thence through pipe $b^3$ into the atmosphere at a suitably remote point. Within the holder is a float E, which is suitably perforated for passage of tubes B' $b$ $b^4$ and pipe C, but fits neatly within the holder and keeps the gas therein out of contact with the water. The tube $b$ is perforated near its upper end, as at $b'$, just below the top of holder, so as to admit gas into the tube, and thus to pipe D, so that gas will always be withdrawn from the top of the holder. The lower ends of pipes C D are open, but are closed or sealed by the water in chamber $a'$. Above the water in chamber $a'$ pipe D connects with an outlet-pipe D', which may lead to the burners, but preferably leads to a second gasometer, or what I call a "cooler and drier," which is constructed substantially like the gasometer above described, similar parts being indicated by like letters of reference; but its holder is not weighted as heavily, so that the gas therein is more expanded than in holder B, which cools and dries the gas more thoroughly before it is passed onto the burners.

Pipe C is connected in chamber $a'$ with the gas-inlet pipe C', which leads from the upper part of the feed-water chamber F, attached to the side of the tank A, as shown, near the top thereof. Within this chamber is placed an inverted gas-trapping vessel G, which has a cap $g$, which projects slightly above the top of the vessel and surrounds the upper end of pipe C', as shown. The vessel G has a similar cap $g^2$, which surrounds a gas-inlet pipe H, that extends down through the bottom of the chamber F and is connected with the generator, as hereinafter explained. Pipe H is utilized both as the conduit for admitting water from chamber F to the generator J and as a conductor for gas from the generator to chamber F. To pipe H, at a point within the chamber F and near the bottom thereof, is connected by a hinge or swinging joint $h'$ a short tube $h$, which lies within vessel G and is capable of swinging from a horizontal to a vertical position therein. Connected to the hinged end of pipe $h$, so as to operatively control the latter, is an arm $h^2$, which lies within vessel G, but is separated from pipe $h$ by and inclosed within an oval tube G', that forms a water-sealed chamber within the casing, and through this tube G' passes the controlling and actuating rod I, the upper end of which is attached to a bracket I', projecting from the holder B, and the lower end of rod I is preferably guided in a tube F', depending from the bottom of chamber F. Rod I has a horizontal return-bend $i$ within tube G', and it is adapted to play through an eye $h^3$ on the end of arm $h^2$, as shown. As the holder B rises and falls rod I is raised and lowered. When the parts are in the position shown in Fig. 2, rod I is in its lowermost position. Consequently loop $i$ has engaged eye $h^3$ and forced arm $h^2$, and with it tube $h$, to horizontal position, as shown, and the open end of tube $h$ being submerged water will flow into the generator through tube $h$ and pipe H. As the gasometer rises loop $i$ will pull arm $h^2$ upward until it reaches the vertical position, as shown in dotted lines, Fig. 2, which will raise the end of tube $h$ above the water cutting off flow to the generator. The eye $h^3$ now stands in such position that the rod I can continue to rise with the holder B without further shifting the arm $h^2$, but holding it and tube $h$ in position to keep water-supply to generator cut off until the holder descends sufficiently to reëngage loop $i$ with eye $h^3$. Of course the amount of swing of the tube $h$ depends upon the descent of the holder, and as the gas is generated very rapidly there is practically but very little water admitted at any one time into the generator.

The generator J comprises a cylindrical vessel having a removable cover J', which is preferably hermetically sealed by means of the swinging bail $j$, pivoted to the vessel, and a bent lever $j'$, pivoted at its bend to the top of the cover J'. The short arm of lever $j'$ is adapted to engage a bolt $j^2$ tapped through the bail, and when lever $j'$ is turned so as to bring its short arm to vertical position the cover will be closed gas-tight. The cover has an inlet-tube $J^2$, which is detachably connected to the lower end of pipe H by a suitable coupling K, and a valve $H^3$ is placed in the lower end of pipe H above coupling K, and, if desired, a similar valve $J^3$ may be placed in pipe $J^2$. When it is desired to detach the generator from the apparatus, valves $H^3$ and $J^3$ may be closed and then coupling K disconnected, thereby detaching the generator from the apparatus without permitting escape of gas from the apparatus. The coupling K which I prefer to use is best shown in Figs. 6 and 7. On the end of pipe J is fitted a socket M, adapted to receive a collar $m$ on the end of pipe J. On socket-piece M is pivoted a bifurcated lever N, the legs of which are pivoted to the legs of a yoke $n$, which is adapted to engage the collar $m$ and bind the same tightly to the socket-piece, as shown in said figures. By turning lever N back over pipe J the yoke is caused to release the collar and the parts can be instantly detached. By simply inserting the collar in the socket, turning the yoke over the collar, and then turning lever N over toward pipe H the parts are quickly and gas-tightly coupled.

The generator contains a number of carbid-holders L, arranged one above the other. Each holder has a central funnel $l$ at its top, below which is a tube $l^2$, which is not in direct communication with the funnel and opens through the bottom of the holder. The holder is divided by radial partitions L' into a series of compartments which communicate through openings $L^2$ in the upper ends of the partitions. The funnel $l$ has an opening $l'$ in its side, which communicates with one (the first) compartment, and tube $l^2$ has an opening $l^3$ in its top, which communicates with another (the last) compartment. The water admittted into the funnel flows through opening $l'$ into the first compartment, and after filling same the water overflows into the next compartment, and after all compartments are thus successively filled the water escapes through opening $l^3$ into tube $l^2$ and thence into the funnel $l$ of the next lower holder, and so on until the whole series of compartments in the series of holders are successively filled. In this way I am enabled to graduate the charges of carbid required to maintain the supply of gas with great nicety, and too sudden and too voluminous generation of gas is prevented.

Operation: The tank A, chamber F, and chamber $a'$ should be properly supplied with water prior to starting the machine, valve $H^3$ being closed. Then suitable charges of carbid are placed in the holders and the latter securely sealed within the generator. The generator is then coupled to the pipe H and valve $H^3$ (and $J^3$, if used) opened, admitting water from chamber F into the generator, and the generated gas flows first into chamber F, where it is somewhat cooled, then passes to the gasometer, and finally to the cooler and drier. When sufficient gas is accumulated in holder B, it rises and causes rod I to raise arm $h'$ and move feed-pipe $h$, so that the water-supply to generator is cut off and remains cut off until holder B again descends sufficiently to cause rod I to reëstablish the water-feed. The return flow of gases through pipe H assists in retarding the flow of water; but I do not depend thereupon to regulate the generation of gas. When it is desired to cleanse or replenish the generator, valve H' is closed and coupling K disconnected, and the generator can then be removed and cleansed and replenished at any convenient place without interfering with the consumption of gas meanwhile.

I do not herein claim the construction of the gasometer *per se* nor the carbid-holders *per se*, these being regarded as subjects for divisional applications.

Having thus described my invention, what I therefore claim as new, and desire to secure by Letters Patent thereon, is—

1. The combination of the gasometer, a water-supply chamber, and a generator; with a pipe for conducting gas from the chamber to the gasometer, a pipe for conducting water from the chamber to the generator and gas from the generator to the chamber, devices for admitting water from said chamber into said generator-pipe, and means actuated by the rise and fall of the gas-holder controlling the operation of said devices, for the purpose and substantially as described.

2. The combination of the gasometer, a water-supply and gas-cooling chamber attached thereto, and a generator below the said chamber; and a pipe for conducting gas from the chamber to the gasometer, a pipe for conducting water from the chamber to the generator and gas from the generator to the chamber; with devices within the chamber for admitting water therefrom into said generator-pipe, and means for controlling the operation of the water-supply devices actuated by the rise and fall of the gas-holder, for the purpose and substantially as described.

3. The combination of a gasometer, a water-supply chamber and a generator; with a pipe connecting the generator with said chamber for conducting water from the chamber to the generator and gas from the generator to the chamber, and a pipe for conducting gas from said chamber to the gasometer, a movable feed-pipe within said chamber connected to said generator-pipe, and means operated by the gasometer for moving said feed-pipe, substantially as described.

4. The combination of a gasometer, a water-supply and gas-cooling chamber and a generator; with a pipe connecting the generator with said chamber for conducting water from the chamber to the generator and gas from the generator to the chamber, and a pipe for conducting gas from said chamber to the gasometer, a hinged feed-pipe within said chamber connected to said pipe, and a vertically-movable rod connected to the gasometer controlling the position of said feed-pipe, substantially as described.

5. The combination of the gasometer, the generator, and a water-supply chamber; with a pipe connecting said gasometer to said chamber, means for admitting water from the chamber into said pipe, controlled by the gasometer; an inverted gas-trapping vessel in said chamber inclosing the water and gas inlet and outlet pipes, and a pipe for conducting gas from the interior of said vessel to the gasometer, substantially as described.

6. The combination of the gasometer, the generator, a water-supply chamber, a pipe connecting said gasometer to said chamber, and a movable feed-pipe for admitting water from the chamber into said pipe; with a vertically-movable rod actuated by the gasometer adapted to control the position of said pipe; an inverted gas-trapping vessel in said chamber inclosing the water-feed pipe, and a pipe for conducting gas from the interior of said vessel to the gasometer, substantially as described.

7. The combination of the gasometer, the generator, and the water-supply chamber, an inverted gas-trapping vessel in said chamber, a pipe for conducting gas from the interior of said vessel to the gasometer, a pipe connected with the generator and leading into the interior of said vessel, a movable water-feed pipe within said vessel, and devices actuated by the gas-holder of the gasometer controlling the rise and fall of said feed-pipe, for the purpose and substantially as described.

8. The combination of the gasometer, the generator, and the water-supply chamber, an inverted gas-trapping vessel in said chamber, a pipe for conducting gas from the interior of said vessel to the gasometer, a pipe connected with the generator and leading into the interior of said vessel, a hinged water-feed pipe within said vessel connected to said generator-pipe, and a vertically-movable rod connected to and actuated by the gas-holder of the gasometer extending into said vessel and controlling the rise and fall of said feed-pipe.

9. The combination of the gasometer, the water-chamber, and the generator; with a detachable pipe connection between the generator and water-chamber through which water is admitted to the generator and gas to the chamber, the water-supply devices within the chamber, and means actuated by the holder of the gasometer, controlling the water-supply to the gasometer, substantially as described.

10. The combination of the gasometer, the water-chamber, and the generator, and a detachable pipe connection between the generator and water-chamber through which water is admitted to the generator and gas to the chamber; with water-feed pipe within the chamber, and a vertically-movable rod connected to and actuated by the holder of the gasometer, said rod controlling the position of the feed-pipe, and a pipe for conducting gas from the water-chamber to the gasometer, substantially as described.

11. The combination of the water-supply chamber, and generator, and a detachable pipe connection between said chamber and generator through which pipe water is admitted directly from the chamber to the generator and through which pipe gas is returned from the generator through the chamber; with the water-feed-regulating devices controlled by the generation of gas, substantially as described.

12. The combination of the water-supply chamber, the generator, and the detachable pipe connection between said chamber and generator through which pipe water is admitted directly from the chamber to the generator and through which pipe gas is returned from the generator through the chamber; with the movable water-feed pipe, and means, controlled by the generation of gas, for raising and lowering said feed-pipe and thereby stopping or starting the water-feed to generator, substantially as described.

13. The combination of the water-supply chamber, the gasometer, and the generator, a pipe connecting the generator with the chamber through which water is conducted to the generator and gas to the chamber, said pipe having a detachable section or coupling intermediate the chamber and generator, and a pipe for conducting gas from said chamber to the gasometer; with a hinged water-feed pipe, and a rod connected to and actuated by the holder of the gasometer, for raising or lowering said feed-pipe, for the purpose and substantially as described.

14. The combination of the water-supply chamber, the gasometer, and the generator, a pipe connecting the generator with the chamber through which water is conducted to the generator and gas to the chamber, said pipe having a detachable section or coupling intermediate the chamber and generator, and a valve for closing said pipe to prevent escape of gas from the chamber when the generator is disconnected; with a pipe for conducting gas from said chamber to the gasometer, a hinged water-feed pipe within said chamber, and a vertically-movable rod connected to and actuated by the holder of the gasometer, for raising or lowering said feed-pipe, for the purpose and substantially as set forth.

15. The combination of a gasometer, a water-supply and gas-cooling chamber, a generator and a pipe connecting the generator and water-chamber, a movable water-feed pipe within said chamber, and a rod connected to the gasometer and having a bend within the chamber, said bend having a sliding engagement with an eye connected with said feed-pipe, substantially as described.

16. The combination of a gasometer, a water-supply and gas trapping and cooling chamber, a generator and a pipe connecting the generator with the water-chamber, a feed-tube in said chamber having a hinge or swing joint connection to said pipe, an arm connected to said tube, and a rod connected to the gasometer having a bend within the water-chamber slidably engaged with and adapted to actuate said arm, substantially as described.

17. The combination of the water-supply chamber, and gasometer connected therewith, and a feed-pipe in said chamber adapted to supply water to said generator; with an inverted gas-trapping vessel in said chamber having a depending water-sealed tube, an arm connected to the feed-pipe projecting into said tube and a rod passing through said tube having a bend engaging said arm, substantially as described.

18. The combination of a generator, a water-supply and gas-cooling chamber, communicating therewith, and a detachable gasometer communicating with said chamber, and with the generator through said chamber for the purpose and substantially as described.

19. The combination of a gasometer, a gas-cooling and water-supply chamber and a generator; a pipe connecting the generator with said chamber, a movable feed-pipe within said chamber connected to said generator-pipe, and means operated by the gasometer for moving said feed-pipe, with pipes for conducting gas from the gasometer to the point of utilization, substantially as described.

In testimony that I claim the foregoing as my own I affix my signature in presence of two witnesses.

MOTT T. STEVENS.

Witnesses:
W. E. PURCELL,
J. A. SLATTERY.